Figure 1:
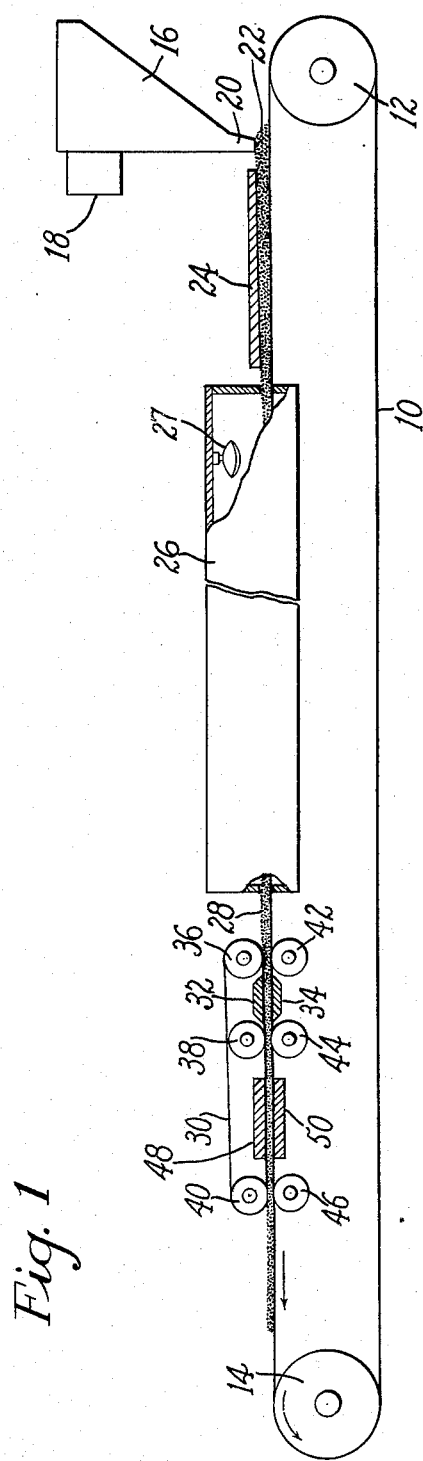

Nov. 22, 1960  A. BRADSHAW ET AL  2,960,727
METHODS OF FORMING DISCRETE THERMOPLASTIC
GRANULES INTO A SINTERED LENGTH
Filed Aug. 7, 1957

*Inventors*
Arthur Bradshaw
Frederick G. Hellyer
Joseph Robbins
Frank R. Smith
Ernest A. Toon
By their Attorney

United States Patent Office 2,960,727
Patented Nov. 22, 1960

2,960,727

METHODS OF FORMING DISCRETE THERMOPLASTIC GRANULES INTO A SINTERED LENGTH

Arthur Bradshaw, Frederick George Hellyer, Joseph Robbins, Frank Richard Smith, and Ernest Arthur Toon, all of Leicester, England, assignors to United Shoe Machinery Corporation, Flemington, N.J., and Boston, Mass., a corporation of New Jersey Filed Aug. 7, 1957, Ser. No. 676,746

Claims priority, application Great Britain Aug. 31, 1956

1 Claim. (Cl. 18—55)

This invention relates to methods of producing microporous sintered plastic and is herein illustrated in its application to methods of producing such material in continuous sheet form.

In the manufacture of articles such, for example, as shoe insoles of microporous sintered plastic it has been the practice heretofore to mold such articles in sheets or in preforms suitable for use in the manufacture of the product. It has been found that substantial economies may be effected by manufacturing such material in continuous sheets and such economies are not offset to any considerable degree by such wastage as may be involved in the manufacture from such material of products such, for example, as shoe insoles.

Accordingly, it is the object of the present invention to provide a simple and commercially practicable method of producing continuous lengths or sheets of microporous sintered plastic. In accordance with the proposed method there is provided in finely granulated form a supply of resin which is preferably of a type comprising vinyl chloride, vinyl acetate copolymer, a coloring agent, a wetting agent and a heat stabilizer. The granular material is loaded into a suitable hopper from which it is discharged upon a conveyor belt to form a layer of uniform depth of approximately 0.750″. The belt is advanced at approximately 0.40 foot per minute to conduct a layer of granular material thereon through a first compaction station where suitable pressure means operating at room temperature reduces the thickness of the layer from approximately 0.750″ to approximately 0.320″. From the first compaction station the conveyor belt conducts the compacted layer of granules to a sintering oven approximately six feet long where radiant heat at approximately 175° C. effects a partial coalescence of the granules to cause cohesion thereof at their mutually contacting surfaces. The coalescence of the granules in the sintering oven reduces the thickness of the layer from 0.320″ to approximately 0.280″. From the sintering oven the conveyor belt conducts the material, which is now in the form of a sintered sheet, to a second compaction station in which mechanical pressure combined with conductive heat at approximately 110° C. is applied to the sheet thus reducing its thickness to approximately 0.125″. From the second compaction station the conveyor belt conducts the sintered sheet through a cooling station where sufficient heat is dissipated from the sheet to increase its tensile strength to a degree sufficient to permit the sheet to be removed from the conveyor belt and wound upon a roll.

The invention will now be described with reference to the accompanying drawings illustrating suitable means for use in practicing the method.

Figure 2:
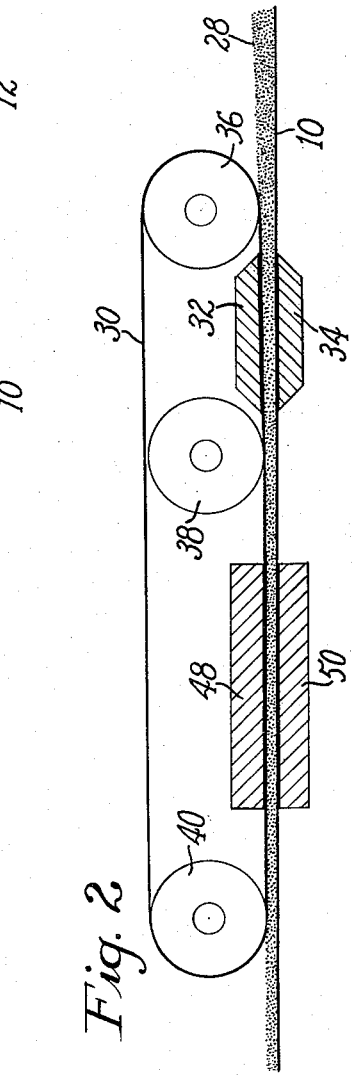

In the drawings,

Fig. 1 is a diagrammatic view in side elevation illustrating a machine suitable for use in practicing the method of the present invention; and Fig. 2 is an enlarged diagrammatic view in side elevation illustrating the pressure belt and mechanisms associated therewith.

The illustrated machine, generally described, comprises a conveyor in the form of an endless belt providing a substantially horizontal continuously moving surface, a hopper for discharging onto the belt thermoplastic granular material such, for example, as a synthetic resinous compound for use in the production of a continuous microporous sintered sheet, a processing chamber in which the granular material is brought to sintering temperature, means for compacting the granular material during its passage from the hopper to the processing chamber and means for further compacting the product after it leaves the processing chamber.

The illustrated conveyor belt comprises an endless band 10 preferably made of stainless steel. The conveyor belt is mounted on two rollers 12 and 14 which are rotated by a motor (not shown) in a counterclockwise direction, as seen in Fig. 1, in order to cause the upper run of the belt to move to the left or from the roller 12 toward the roller 14. A hopper 16 is mounted above the belt 10 and adjacent to the roller 12. In order to agitate the hopper 16 horizontally thereby to effect a uniform flow of granular material therefrom a suitable vibrator 18 is fixed to the hopper. In the operation of the illustrated machine granular material in the hopper 16 flows uniform through a discharge orifice in the reduced lower end portion or spout 20 of the hopper and onto the belt 10. In the illustrated organization the lower extremity of the hopper 16 is ¾″ away from the belt 10. It will be understood that the spacing of the hopper from the belt determines the thickness or depth of the layer of granular material on the belt at the loading station.

As the layer of granular material, identified in the drawing by the numeral 22, advances from the loading station it passes beneath and in contact with a fixed plate 24 the lower surface of which is inclined downwardly to the left as seen in the drawing. During the passage of the granular material from one end of the plate to the other the material is compacted from a thickness of 0.750″ to a thickness of 0.320″.

After passing the plate 24 the granular layer 22 enters a processing chamber herein illustrated as a tunnel 26 in which it is subjected to a sintering temperature of approximately 175° C. In the illustrated organization the heat is applied uniformly throughout the length of the chamber by suitable electrical elements such, for example, as the lamp 27 shown in Fig. 1. The processing of the granular material in the chamber 26 causes partial coalescence thereof into a microporous sintered sheet having a thickness of 0.270″ as compared to the thickness of 0.320″ of the granular material at the ingress end of the chamber. It will be understood that the tunnel must be long enough to provide a heating period of sufficient duration to effect the sintering of the granular layer 22. In the illustrated machine the chamber is approximately six feet long and the conveyor belt 10 advances at a speed of 0.40′ per minute.

After passing from the egress end of the chamber, the sintered sheet 28 is subjected to the compacting pressure of a belt or band 30 which, in the illustrated organization, is an endless length of stainless steel. In order to promote the compaction of the sheet 28 it is subjected to heat of about 110° C. by a fixed heating plate 32 located above and contiguous to the band 30 and a similar heating plate 34 located below and contiguous to the conveyor belt 10. The pressure band 30 is mounted upon three cylindrical rollers 36, 38 and 40. Located directly beneath said rollers respectively and in supporting relation to the conveyor belt 10 are similar rollers 42, 44 and 46. The rollers 36 and 40 are rotated in a clockwise direction as seen in the drawing in order to advance the lower run of the band 30 in the same direction and at the same rate of speed as the conveyor belt 10. The rollers 42, 44 and 46 which support the conveyor belt 10 are so arranged that their axes lie in a common horizontal plane below the upper run of the conveyor belt and so spaced therefrom that the rollers provide support for the belt. The rollers 36, 38 and 40 are so positioned relatively to the rollers 42, 44 and 46 that the lower run of the band 30 bears against the sintered sheet 28. The axes of the rollers 38 and 40 lie in a common horizontal plane but the axis of the roller 36 is located slightly above said plane so that the pressure run of the band 30 extending from the roller 36 to the roller 38 is inclined downwardly and to the left, as seen in Fig. 1, relatively to the conveyor belt 10. The idle run of the band 30 extending from the roller 38 to the roller 40 serves a purpose hereinafter described. During its passage beneath the pressure run of the band 30 the sintered sheet 28 is compacted to its final thickness. In the illustrated organization the distance between the pressure band 30 and the conveyor belt 10 at the ingress end of the pressure station is approximately 0.270" and the distance between the pressure band and the conveyor belt at the egress end of the pressure station is 0.125". During the latter part of its travel between the conveyor belt and the pressure band 30 the sintered sheet passes between two cooling plates 48 and 50, the former being located above and in contiguous relation to the idle run of the pressure band and the latter being located below and contiguous to the upper run of the conveyor belt 10. The dissipation of heat from the sintered sheet 28 by the cooling plates 48 and 50 causes a sufficient setting of the sheet to give it the cohesive strength required for the handling of the sheet after it passes beyond the roller 14.

A compound obtainable in granular form and suitable for the production of a microporous sintered sheet comprises 66.53 parts by weight of a vinyl chloride, vinyl acetate copolymer having a chloride/acetate ratio of 95/5, 32.25 parts by weight of a non-volatile plasticizer, 0.64 part by weight of a coloring agent and filler, 0.22 part by weight of a commercial wetting agent (e.g. Tween 20) and 0.36 part by weight of bisphenol epichlorohydrin condensate. Said condensate acts as a heat stabilizer for polyvinyl chloride and the wetting agent is believed to aid transpiration through the microporous sintered sheet.

A microporous sintered sheet produced in the illustrated machine from a compound such as that above set forth is applicable to various uses in the form in which it is taken from the machine and is also useful as one element of a laminate the other element of which is a porous fiber board such, for example, as neoprene latex bonded fiber. Such a laminate is useful, for example, in the manufacture of insoles for footwear.

Having thus described our invention, what we claim as new and desire to secure by Letters Patent of the United States is:

That method of producing a microporous sintered sheet comprising providing in finely granulated form a supply of resin comprising vinyl chloride, vinyl acetate copolymer, a coloring agent, a wetting agent and a heat stabilizer, said method comprising providing a conveyor belt for receiving the granulated material from a suitable hopper, advancing the belt at approximately 0.40 foot per minute to conduct a layer of granular material thereon approximately 0.750" thick through a first compaction station, a sintering oven, a second compaction station and a cooling station, compacting the layer in the first compaction station at room temperature to reduce the thickness of the layer from approximately 0.750" to approximately 0.320", conducting the layer from the first compaction station to the sintering oven, which is approximately six feet long, during the passage of the layer through the oven applying to the layer radiant heat at approximately 175° C. thereby to effect a partial coalescence of the granules sufficient to cause cohesion of the granules at their mutually contacting surfaces, such coalescence causing a reduction in thickness of the layer to approximately 0.280", conducting the sintered sheet from the oven to the second compaction station, in said second compaction station applying mechanical pressure to the layer while applying conductive heat at approximately 110° C. thus reducing the thickness of the sintered sheet to approximately 0.125", and then conducting the sintered sheet from the second compaction station through the cooling station thereby to cause dissipation of heat from the sheet and consequent increase in its tensile strength.

References Cited in the file of this patent

UNITED STATES PATENTS

| | | |
|---|---|---|
| 2,075,735 | Loomis | Mar. 30, 1937 |
| 2,297,248 | Rudolph | Sept. 29, 1942 |
| 2,605,506 | Miller | Aug. 5, 1952 |
| 2,648,262 | Croston et al. | Aug. 11, 1953 |
| 2,678,081 | Rainard et al. | May 11, 1954 |
| 2,771,637 | Silvasey et al. | Nov. 27, 1956 |
| 2,779,969 | Bose | Feb. 5, 1957 |

FOREIGN PATENTS

| | | |
|---|---|---|
| 611,148 | France | June 28, 1926 |
| 200,694 | Australia | Jan. 11, 1956 |